May 20, 1930. E. G. LIVESAY 1,759,651
LIFTING DEVICE
Filed May 19, 1926 2 Sheets-Sheet 1
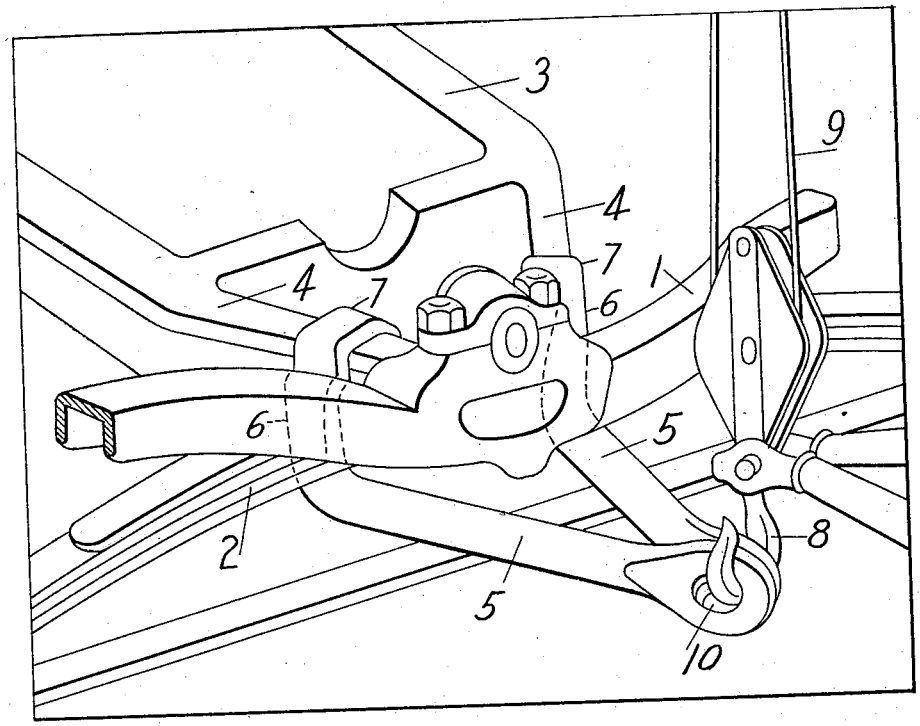
Fig.1.
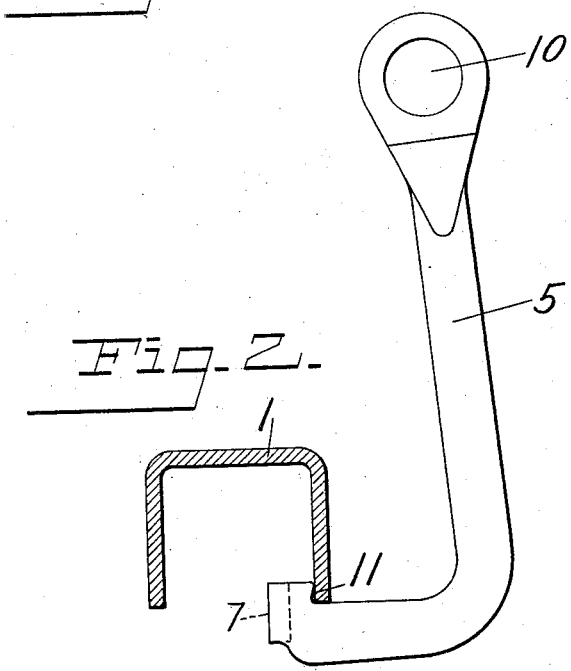
Fig.2.
Inventor
E. G. LIVESAY.
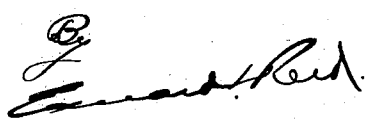
Attorney

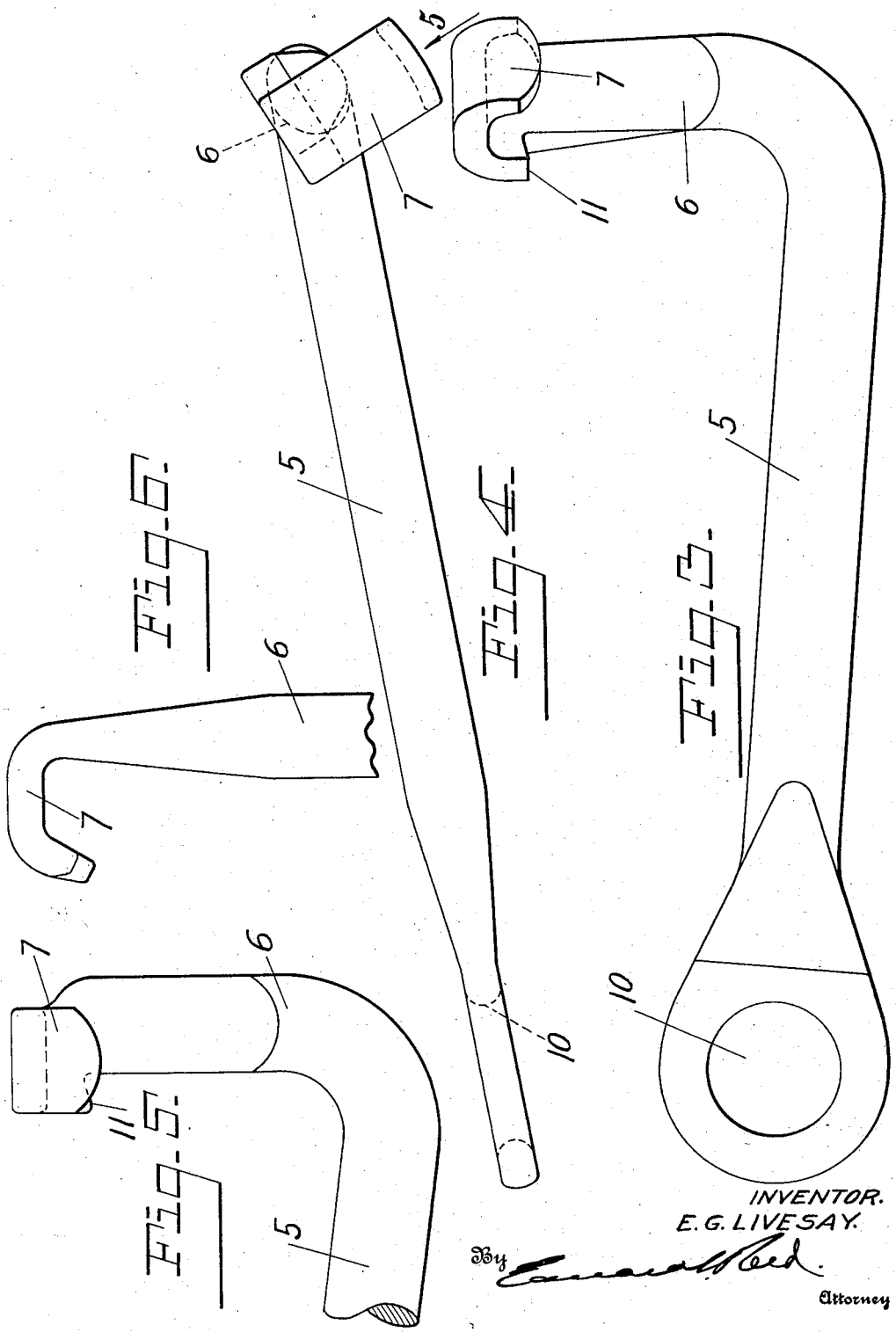

Patented May 20, 1930

1,759,651

UNITED STATES PATENT OFFICE

EVERETT G. LIVESAY, OF DAYTON, OHIO

LIFTING DEVICE

Application filed May 19, 1926. Serial No. 110,279.

This invention relates to a lifting device for the front end of an automobile and is designed primarily for lifting the front end of an automobile the front running gear of which has been damaged to such an extent as to render it inoperative and for supporting the same while the automobile is being towed to a garage, but, as will be apparent, it may be utilized for lifting the front end of an automobile and supporting the same independently of the wheels for any purpose whatsoever.

One object of the invention is to provide a lifting device which will be simple in construction and which may be quickly and easily connected with the automobile.

A further object of the invention is to provide such a lifting device which will be of a strong durable character and will be connected with the automobile in such a manner that it will not be displaced by jars or vibrations to which the automobile may be subjected while being towed.

A further object of the invention is to provide a lifting device which may be connected either with the oil pan of the automobile or with the front frame member.

A further object of the invention is to provide a lifting device which may be produced at a low cost and which, when not in use, will occupy but little space so that it may be stored in a tool box or the like.

Other objects of the invention will appear as the device is described in detail.

In the accompanying drawings Fig. 1 is a perspective view of a portion of the front end of an automobile showing my lifting device connected with the oil pan thereof; Fig. 2 is a side elevation of one member of the lifting device showing the same connected with the front frame member of the automobile; Fig. 3 is a side elevation of one member of the lifting device; Fig. 4 is a plan view of one member of the lifting device; Fig. 5 is a side elevation of the hook on one member of the lifting device, looking in the direction of the arrow 5 on Fig. 4; and Fig 6 is an edge view of the hook shaped portion of one member of the lifting device.

In these drawings I have illustrated one embodiment of my invention and have shown the same as designed primarily for use in connection with a Ford automobile but it will be understood that the device may take various forms and that the supporting members may be so shaped as to accommodate the same to automobiles of different constructions.

In Fig. 1 of the drawings I have illustrated a portion of the front end of a Ford automobile including the front frame member 1, front spring 2 and the oil pan or crank case 3. The forward portions of the side walls of the oil pan converge forwardly, as shown at 4, and are rigidly secured to the frame member 1. These converging walls lie in front of the engine so that their upper edges are exposed and I utilize these exposed edges as a means for connecting the lifting device with the automobile. The lifting device consists of a pair of supporting members which may extend beneath the front frame member and front spring of the automobile and have at their rear ends portions provided with hooks to engage over the edges of the oil pan. The forward ends of the supporting members are so constructed that a suitable hoisting device may be connected therewith. When an upward thrust is exerted on the forward ends of the supporting members these will be caused to engage the fulcrum on the spring 2, in the present instance, thereby drawing the hook shaped portions into firm engagement with the upper edges of the walls of the oil pan and thus providing a very firm connection between the lifting device and the automobile and a strong durable support for the front end of the machine.

The supporting members may be of any suitable character and may be constructed in any suitable manner but, as here shown, each member is forged, or otherwise formed, from a single bar of metal. In the construction illustrated each supporting member comprises an elongated body portion 5 having at its rear end a laterally extending portion 6 which, when the supporting members are arranged as shown in Fig. 1, extends upwardly in the rear of the spring 2. This upwardly extending portion of the supporting member is preferably flattened and has its upper end bent to form a hook 7 which will fit over the upper edge of one wall of the oil pan. When the two supporting members are connected with the automobile the body portions 5 thereof will converge forwardly and these portions are provided at their forward ends with means for connecting the same with a suitable hoisting device. Ordinarily this hoisting device will comprise a hook 8 carried by a cable 9, which may depend from the crane of a wrecking truck or from any other suitable support. I have therefore here shown the forward ends of the supporting members as flattened and provided with openings 10 which, when the two members are in their operative positions, will be in alinement and adapted to receive the hook 8. The two supporting members are preferably separate one from the other and it will be apparent that they may be very quickly and easily connected with the automobile by passing the rear ends thereof beneath the spring and engaging the hook shaped portions thereof over the respective side walls of the oil pan and then inserting the hook 8 through the openings 10 at the forward ends of the two members. The upward pull of the hook on the forward ends of the members will cause the same to engage the spring 2 and fulcrum thereon, thus drawing the hooks into very firm engagement with the edges of the oil pan and effectively preventing any displacement of the hooks due to the vibrations or jars to which the automobile may be subjected while being towed. The character of the connecting members is such that when not in use they will occupy but little space and may be stored in a tool box on a wrecking truck or in any other suitable location.

The supporting members are so constructed that they may be applied directly to the front frame member, when it is desired to lift the front end of the automobile but the latter is not to be towed. To this end the laterally extending portions 6 of the supporting members are provided at their outer ends, adjacent to the hook shaped portions 7 thereof, with offset portions 11 which form shoulders facing inwardly, that is, toward the body portions of the respective supporting members. This construction permits the supporting member to be applied to the frame member 1, which is channel shaped, as shown in Fig. 2, by inserting the hook shaped portion within the channel of the frame member, in which position the shoulder formed by the offset portion 11 thereof will engage the adjacent flange of the frame member and retain the hook within the channel. When thus connected the body portion 5 of the supporting member is arranged in an upright position and when the two supporting members have been applied to the frame member on opposite sides of the center thereof an upward pull on the supporting members will cause the same to firmly engage the frame and lift the front end of the machine.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a lifting device of the character described, a supporting member comprising an elongated portion, a transverse portion at one end of said elongated portion, and a hook shaped portion at the outer end of said transverse portion, said transverse portion having an inwardly facing shoulder adjacent to said hook shaped portion, and said elongated portion also having at its other end means for connecting the same with a hoisting device.

2. A lifting device for an automobile comprising a pair of lifting members each having a substantially straight elongated body portion, said body portion having at its rear end an upwardly extending flattened portion, the upper end of which is shaped to form a hook, said hook being offset from said upwardly extending portion in the direction of said body portion, and the body portions of the two members converging forwardly and having means for connecting the forward ends thereof with a single hook of a hoisting device.

In testimony whereof, I affix my signature hereto.

EVERETT G. LIVESAY.